W. J. HIGGS.
NUT LOCK.
APPLICATION FILED MAR. 24, 1919.
1,320,006.
Patented Oct. 28, 1919.
2 SHEETS—SHEET 1.
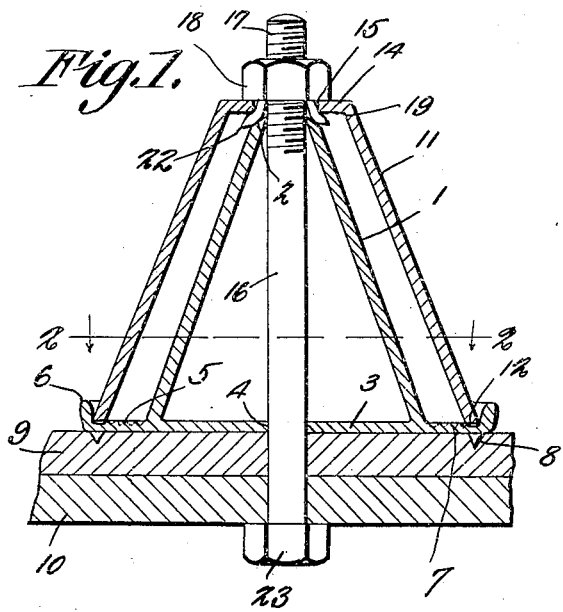
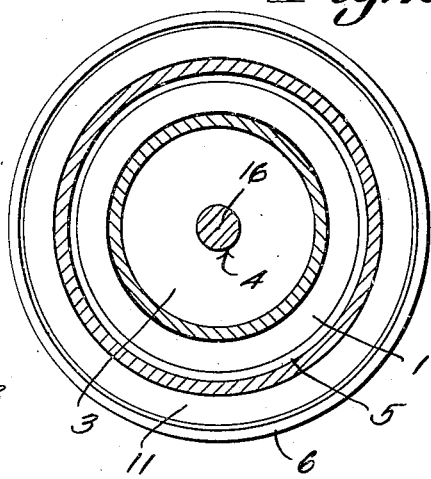
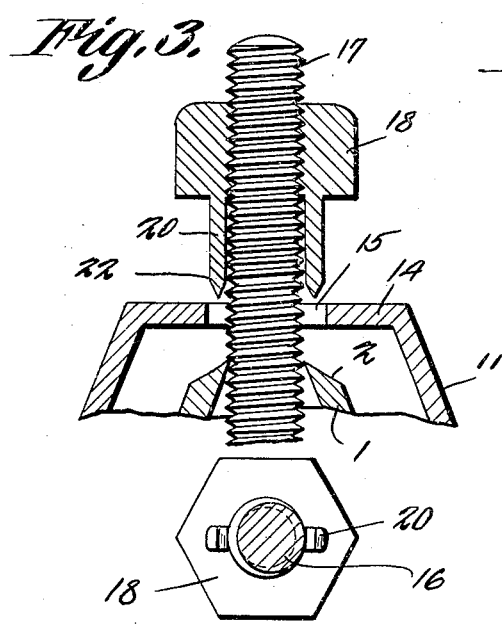
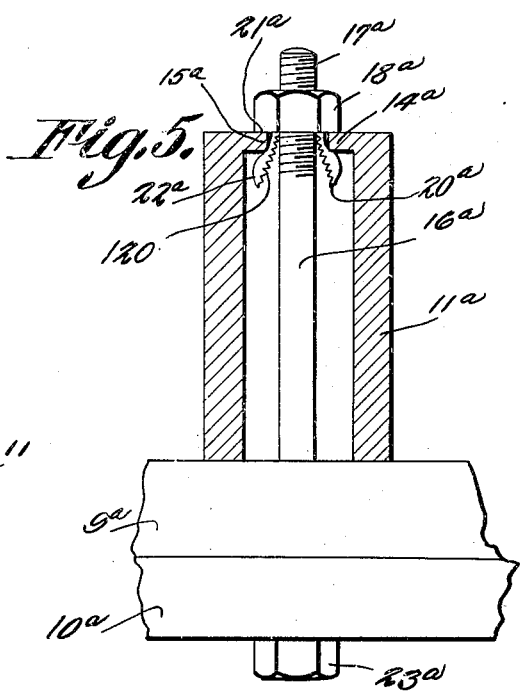
Inventor,
W. J. Higgs
By C. A. Snow & Co.
Attorneys.

W. J. HIGGS.
NUT LOCK.
APPLICATION FILED MAR. 24, 1919.
1,320,006.
Patented Oct. 28, 1919.
2 SHEETS—SHEET 2.
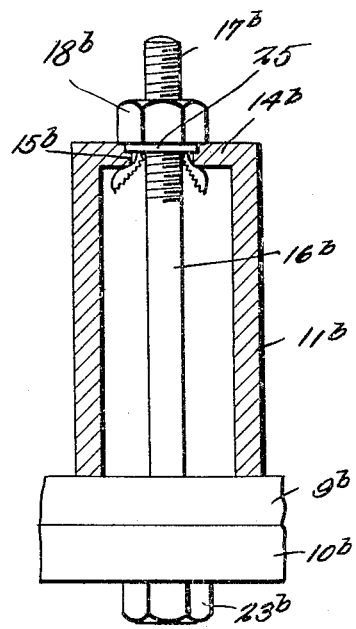
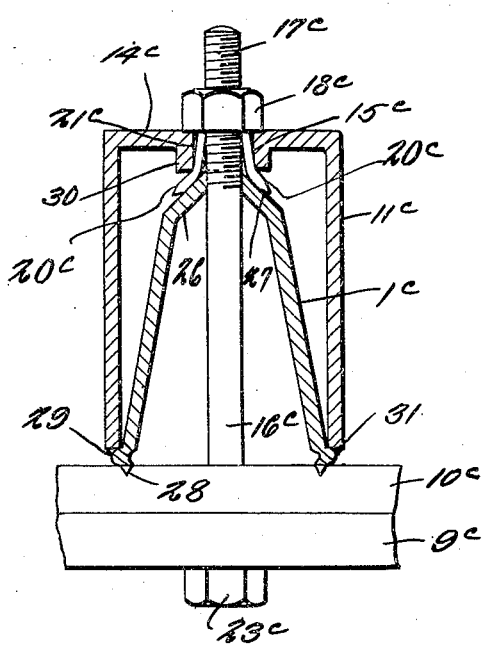
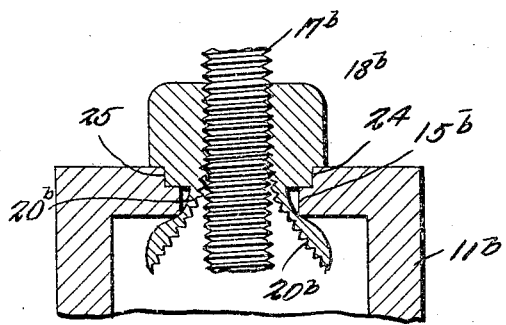
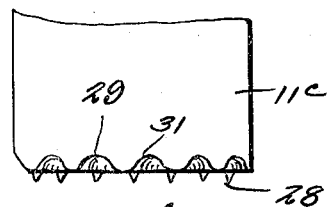
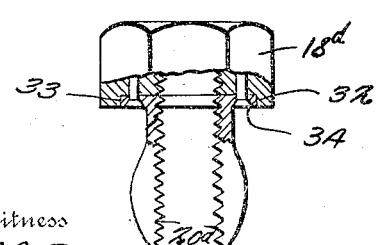
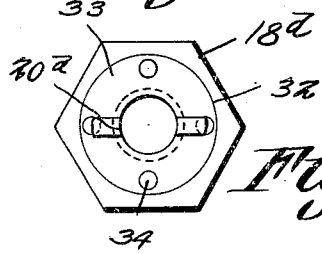
Inventor,
W. J. Higgs
By C. A. Snow & Co.
Attorneys.

UNITED STATES PATENT OFFICE.

WALLACE J. HIGGS, OF LEHI, UTAH.

NUT-LOCK.

1,320,006.   Specification of Letters Patent.   Patented Oct. 28, 1919.

Application filed March 24, 1919. Serial No. 284,728.

*To all whom it may concern:*

Be it known that I, WALLACE J. HIGGS, a citizen of the United States, residing at Lehi, in the county of Utah and State of Utah, have invented a new and useful Nut-Lock, of which the following is a specification.

The device forming the subject matter of this application is a nut lock, and the invention aims to provide a simple means whereby, through the instrumentality of tongues or arms on the nuts, the nut may be held against rotation.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:—

Figure 1 shows in section, a nut lock embodying one form of the invention, the nut being in locked position; Fig. 2 is a cross section on the line 2—2 of Fig. 1; Fig. 3 is a fragmental sectional detail showing the parts as they will appear before the nut is locked; Fig. 4 is a cross section taken through the bolt and showing the nut; Fig. 5 is a view, partly in section, showing a modification; Fig. 6 is a view partly in section, showing a further modification; Fig. 7 is a sectional detail enlarged from Fig. 6; Fig. 8 is a longitudinal section showing a modification; Fig. 9 is a fragmental side elevation illustrating a portion of the modified form delineated in Fig. 8; Fig. 10 is a side elevation showing a modified form of nut, parts being broken away; and Fig. 11 is a bottom plan of the nut shown in Fig. 10.

In carrying out the invention as disclosed in Figs. 1, 2, 3 and 4, there is provided an inner tubular member 1 which may be of conical form, the upper end of the member 1 being beveled, as shown at 2. The member 1 may or may not include a bottom 3, but if a bottom 3 is employed, then there is an opening 4 in the bottom. The member 1 is supplied at its lower end with an outstanding flange 5 having a circumscribing lip 6. A ring of teeth 7 is fashioned on the flange 5 relatively close to the lip 6. Upon its lower surface, the flange 5 carries prongs 8 adapted to engage one piece of material indicated at 9, it being presupposed that two pieces 9 and 10 of material are to be held together.

The invention includes an outer tubular member 11 which is of frusto-conical form. The lower end of the outer tubular member 11 rests on the flange 5 of the inner tubular member 1 and has teeth 12 coöperating with the teeth 7, to prevent relative circumferential movement between the members 1 and 11. The outer tubular member 11 includes a top 14 having an opening 15.

A bolt 16 passes through the pieces 9 and 10 of the material, through the opening 4 in the bottom 3, through the upper end of the inner member 1, and through the opening 15 in the top 14 of the outer tubular member 11. The bolt 16 embodies threads 17, and a head 23 coöperating with the piece of material indicated at 10.

A nut 18 is threaded on the part 17 of the bolt 16 and includes arms 20. The arms 20 are tapered at their lower ends as shown at 22, to facilitate the passage of the arms into the opening 15 in the top 14 of the outer tubular member 11.

Let it be supposed that the parts are arranged as shown in Fig. 3. Then, if the nut 18 be advanced on the threaded part 17 of the bolt 16, the arms 20 will enter the opening 15 in the top 14 of the outer tubular member 11. The tapered ends 22 of the arms 20, ultimately, come into contact with beveled or inclined upper edge 2 of the inner tubular member 1, and are deflected laterally, to engage beneath the top 14 of the outer tubular member 11, as shown in Fig. 1. Thus, the nut 18 is held against accidental rotation with respect to the outer tubular member 11, relative rotation between the members 11 and 1 being prevented, because these members are supplied with the interengaging elements 12 and 7. The inner tubular member 1 cannot rotate with respect to the piece 9 of material, because the prongs 8 are engaged in the piece of material.

In Fig. 5 of the drawings a modified form of the invention is shown. In this figure, parts hereinbefore described have been designated by numerals previously used, with the suffix "a". The form shown in Fig. 5, is characterized by the fact that the member 11ª, only, is used, the arms 20ª being resilient, so as to spring outwardly, and to engage beneath the top 14ª. The arms 20ª, further, may be internally threaded as at 120 to coöperate with the threads 17ª, to avoid damage to the latter.

Fig. 6 discloses a further modification, supplemented by Fig. 7. In these figures, parts hereinbefore described have been designated by numerals previously used with the suffix "b". The top of the member 11ᵇ is provided, about the opening 15ᵇ, with a counter-sunk enlargement 24, adapted to receive a neck 25, on the nut 18ᵇ, the operation of the structure being the same as that described in connection with Fig. 5.

In Figs. 8 and 9, a further modification appears, parts hereinbefore alluded to being designated by numerals previously used, with the suffix "c". In this form of the invention, the inner tubular member 1ᶜ is of conical form and includes a top 26 having an inclined outer surface 27. The outer tubular member 11ᶜ is of cylindrical form, as are the members 11ᵇ and 11ª. The inner tubular member 1ᶜ is supplied with prongs 28 adapted to engage the piece 10ᶜ of material the said member 1ᶜ being equipped adjacent its lower end with laterally extending bosses 29. The top 15ᶜ of the member 11ᶜ has a depending neck 30 and in the lower edge of the member 11ᶜ there are notches or seats 31 receiving the bosses to prevent relative rotation between the members 11ᶜ and 1ᶜ. The operation of the structure shown in Figs. 8 and 9 will be understood clearly from what has been stated hereinbefore in connection with that form of the invention depicted in Fig. 1, it being obvious that the arms 20ᶜ will be deflected laterally to coöperate with the inner end of the neck 30, by engagement with the inclined surface 27.

In Figs. 10 and 11, disclosing a modification, parts hereinbefore described have been designated by numerals formerly used, with the suffix "d". In this form, the nut 18ᵈ is provided on its inner surface with a recess 32 receiving a ring 33 held in place by securing devices 34, the ring carrying the arms 20ᵈ, which are of the sort hereinbefore described in connection with Fig. 5.

Having thus described the invention, what is claimed is:—

1. A cup-shaped inverted nut lock comprising a tubular member having a top provided with an opening; a bolt in the opening and disposed axially of said member; and a nut on the bolt, the nut having arms prolonged through the opening and extended laterally to coöperate with the top, the arms being spaced from that end of the tubular member which is remote from the top.

2. A nut lock comprising inner and outer members provided with interengaging elements detachably coöperating to prevent relative rotation between said members, the outer member having a top provided with an opening, and the inner member having an inclined surface coöperating with the opening; and a nut on the bolt, the nut including a flexible arm bent laterally, by engagement with the inclined surface of the inner member, to coöperate with the top of the outer member.

In testimony that I claim the foregoing as my own, I have hereto affixed my signature in the presence of two witnesses.

WALLACE J. HIGGS.

Witnesses:
JAMES ALLRED,
M. E. KEARNEY.

Copies of this patent may be obtained for five cents each, by addressing the "Commissioner of Patents, Washington, D. C."